United States Patent [19]

Hughes et al.

[11] Patent Number: 5,519,617
[45] Date of Patent: May 21, 1996

[54] TORQUE MANAGED TRACTION CONTROL FOR THE DRIVE WHEELS OF AN AUTOMOTIVE VEHICLE

[75] Inventors: Joseph L. Hughes, Belleville; Louis R. Christensen, Canton; Wallace R. Wade, Farmington Hills; Peter J. Grutter, Plymouth; Michael A. Weyburne, Northville, all of Mich.

[73] Assignee: Ford Motor Company, Dearborn, Mich.

[21] Appl. No.: 57,920

[22] Filed: May 7, 1993

[51] Int. Cl.⁶ ........................................... B60T 8/00
[52] U.S. Cl. .................. 364/426.03; 180/197; 303/112; 303/113.2
[58] Field of Search ................ 364/426.03, 426.01, 364/426.02, 431.07; 180/197; 303/112, 113.2; 192/1.22, 1.23, 1.24

[56] References Cited

U.S. PATENT DOCUMENTS

| | | | |
|---|---|---|---|
| 4,554,990 | 11/1985 | Kamiya et al. | 180/197 |
| 4,701,682 | 10/1987 | Hirotsu et al. | 364/426.03 |
| 4,771,848 | 9/1988 | Namba et al. | 180/197 |
| 4,788,644 | 11/1988 | Inagaki | 364/426.03 |
| 5,009,294 | 4/1991 | Ghoneim | 192/1.22 |
| 5,103,399 | 4/1992 | Iwata et al. | 364/426.03 |
| 5,224,044 | 6/1993 | Tamura et al. | 364/426.03 |
| 5,238,081 | 8/1993 | Maeda et al. | 180/197 |
| 5,278,761 | 1/1994 | Ander et al. | 364/426.01 |
| 5,297,662 | 3/1994 | Tsuyama et al. | 180/197 |

*Primary Examiner*—Kevin J. Teska
*Assistant Examiner*—Tan Q. Nguyen
*Attorney, Agent, or Firm*—Peter Abolins; Roger L. May

[57] ABSTRACT

An electronic driveline controller and traction control method for an engine driven vehicle wherein the tractive effort of the driving wheels is controlled to avoid excess slip of the traction wheels relative to the vehicle road surface, the traction control being achieved by total powertrain torque management whereby the torque delivered to the driving wheels is a control parameter that depends upon the magnitude of sensed operating variables for the vehicle driveline.

5 Claims, 7 Drawing Sheets

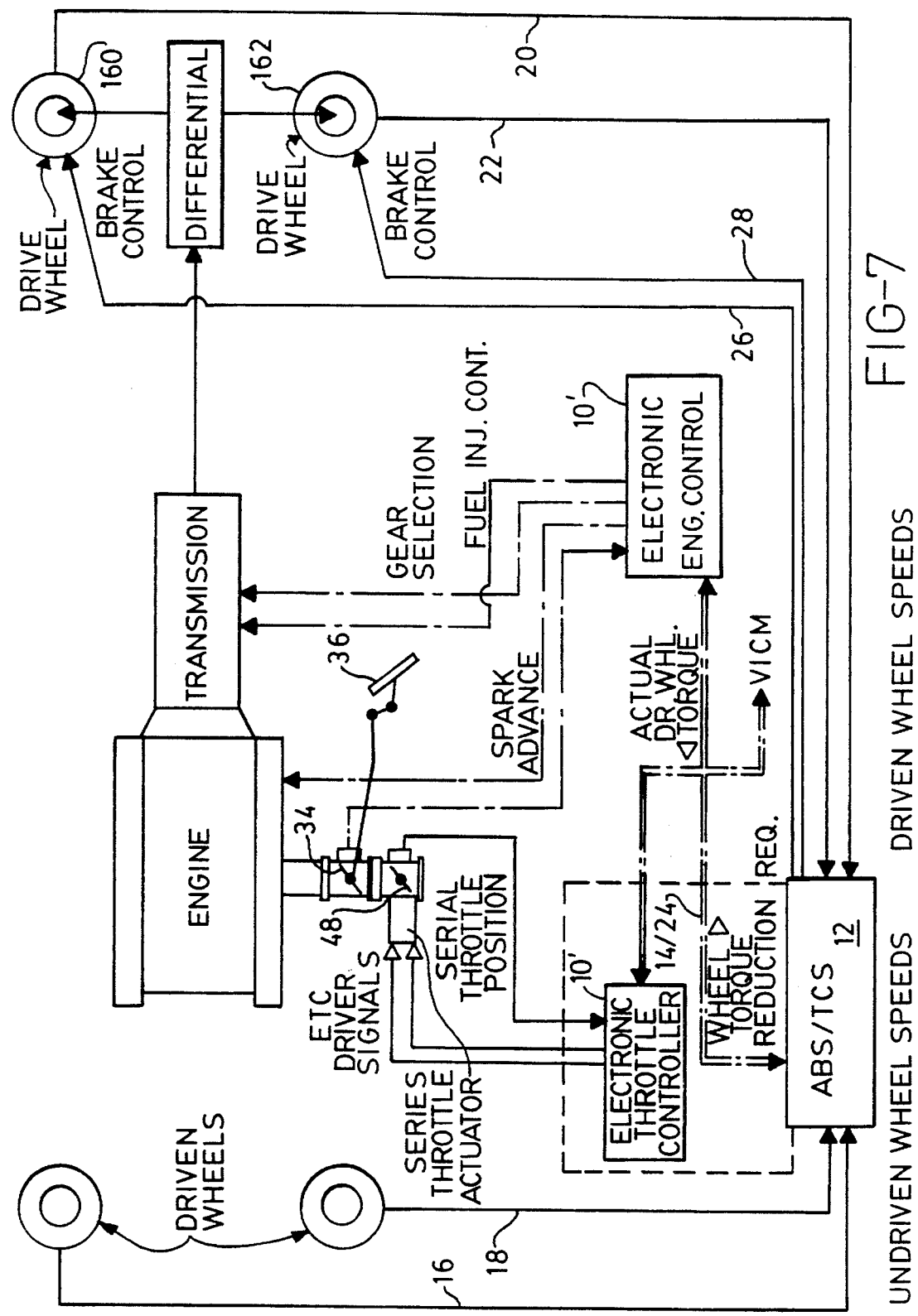

5,519,617

TORQUE MANAGED TRACTION CONTROL FOR THE DRIVE WHEELS OF AN AUTOMOTIVE VEHICLE

TECHNICAL FIELD

An electronic traction system for the drive wheels of an engine powered vehicle.

BACKGROUND OF THE INVENTION

Our invention relates generally to vehicle acceleration slip control for maintaining maximum frictional driving force at the vehicle drive wheels, the frictional force being determined by the loading on the drive wheels and the coefficient of friction between the road surface and the drive wheels during operation of the vehicle.

We are aware of prior art traction control systems using electronic microprocessors for limiting the tractive effort developed by vehicle traction wheels at the time of vehicle acceleration. A typical design approach is embodied in the acceleration slip control system of U.S. Pat. No. 4,554,990 in which a drive wheel speed sensor senses rotational speed of the drive wheel to produce a first speed signal and a separate speed sensor detects the speed of the non-driving or driven wheel. The two signals are compared to determine whether a slip condition exists. If the speed of the driven wheel at any given instant is less than the speed of the drive wheel, a control signal representative of the magnitude of the slip is generated.

A microprocessor in the system described in the '990 patent determines the rate of change of angular velocity of the drive wheel with respect to the driven wheel in order to provide the input data for an acceleration calculation performed by the microprocessor. A drive wheel controller responds to the control signal that represents drive wheel slip for controlling the driving force of the wheel. This usually is accomplished by changing the engine torque so that a controlled amount of slip can be maintained to achieve maximum tire traction.

It is desirable to maintain a small degree of slip, measured as a percentage of wheel speed, in order to achieve maximum traction control. Typical examples for desired wheel slip for maximum traction might be some value between 3% and 8% of driven wheel speed.

Another prior art teaching dealing with acceleration slip control is found in U.S. Pat. No. 4,788,644 wherein provision is made for maintaining a controlled slip of approximately 10% of the driving wheel velocity using driving wheel speed and non-driving wheel speed as sensed input data for a microprocessor, and wherein provision is made for terminating the slip control to enable immediate acceleration when the need for traction control ceases to exist during the acceleration mode.

In prior art teachings such as those found in the prior art patents mentioned above, the management of the traction control torque includes a controller that reduces engine torque either directly or by means of an electronic signal command to an electronic microprocessor, which in turn controls the engine fuel delivery rate or fuel air ratio or some other engine control parameter. Such a system, of necessity, results in control errors due to torque friction torque and other torque losses including transmission gearing losses as well as unknown torque multiplication developed by the transmission gearing and by the hydrokinetic torque converter in the torque delivery driveline.

BRIEF DESCRIPTION OF THE INVENTION

The improvement of our invention is capable of achieving a driving wheel slip control that does not require the use of engine torque as a control parameter. Rather, it avoids large control errors in the system and improves the response of the controller to the requirements of the traction control by using total driving axle torque as a control parameter. This automatically accounts for the torque multiplication that occurs in the hydrokinetic torque converter and in the multiple ratio gearing of the automatic transmission, and the friction torque losses that occur in the transmission gearing and in the final drive gearing, such as in the axle and differential assembly. In this way, more precise traction control is achieved and immediate response to changing requirements of the traction controller is obtained as wheel spin in excess of the predetermined desired wheel spin is avoided.

BRIEF DESCRIPTION OF THE DRAWINGS

FIG. 7 is a schematic representation of the system of our invention wherein provision is made for low speed wheel brake operation to control slip and for series throttle adjustment for supplementary slip control.

PARTICULAR DESCRIPTION OF THE INVENTION

In the traction slip control system of our invention, an interaction occurs between the traction controller and the engine controller to reduce the power or torque applied to the driving wheels when a slip condition exists. That is, when the percentage of wheel slip exceeds a desired value, such as a wheel slip of about 3% to 8% of the driving wheel speed, a torque correction is made. A corrective measure for maintaining the slip in the desired slip zone will take place as the wheel spin is computed by comparing the angular velocity of the drive wheels with the angular velocity of the driven wheels. The angular velocity of the non-driving wheels is that angular velocity that would be expected for the drive wheels if the vehicle were moving on a road with the road wheels in rolling contact with the road surfaces without slip. If the angular velocity of the drive wheels is greater than the speed of the non-driving wheels, the system of our invention will apply the wheel brakes or reduce the power or output torque of the total powertrain by initiating corrective measures such as closing of the series throttle, reducing the engine spark advance, or changing the air/fuel ratio, or changing the exhaust gas recirculation valve setting.

The tractive force, hereinafter identified as $F_t$, that drives the vehicle acts in a direction parallel to the road. This force is the result of the net torque of the drive wheel and its effective drive radius. The drive radius, for purposes of this description, will be referred to as $r_d$. The net torque at the drive wheel is equal to the torque applied to the wheel by the driving axle less the inertia torque of the wheel. The maximum force that can be transmitted to the road without slipping is a function of the total downforce on the tire and the coefficient of friction between the tires and the road surface. For purposes of this description, the maximum force that can be transmitted to the road without slipping is $F_m$ and the total downforce is represented by the symbol $F_d$. The coefficient of friction between the road and the tire is $\mu$. Thus:

$$F_m = \mu \times F_d.$$

If the force transmitted to the road, $F_m$, is exceeded, the excess torque applied to the wheel from the axle acts against the inertia of the wheel assembly to accelerate the wheel assembly. This results in excess wheel spin.

For purposes of this description, the torque applied to the wheel is referred to as the total axle torque $T_a$. Inertia torque is referred to by the symbol $J_w$. The tractive force, $F_t$, then can be represented approximately by the following equation:

$$F_t \approx F_m \approx \mu \times F_d \approx \frac{T_a - J_w \frac{\delta \omega^2}{\delta t^2}}{r_d}$$

Figure 2:
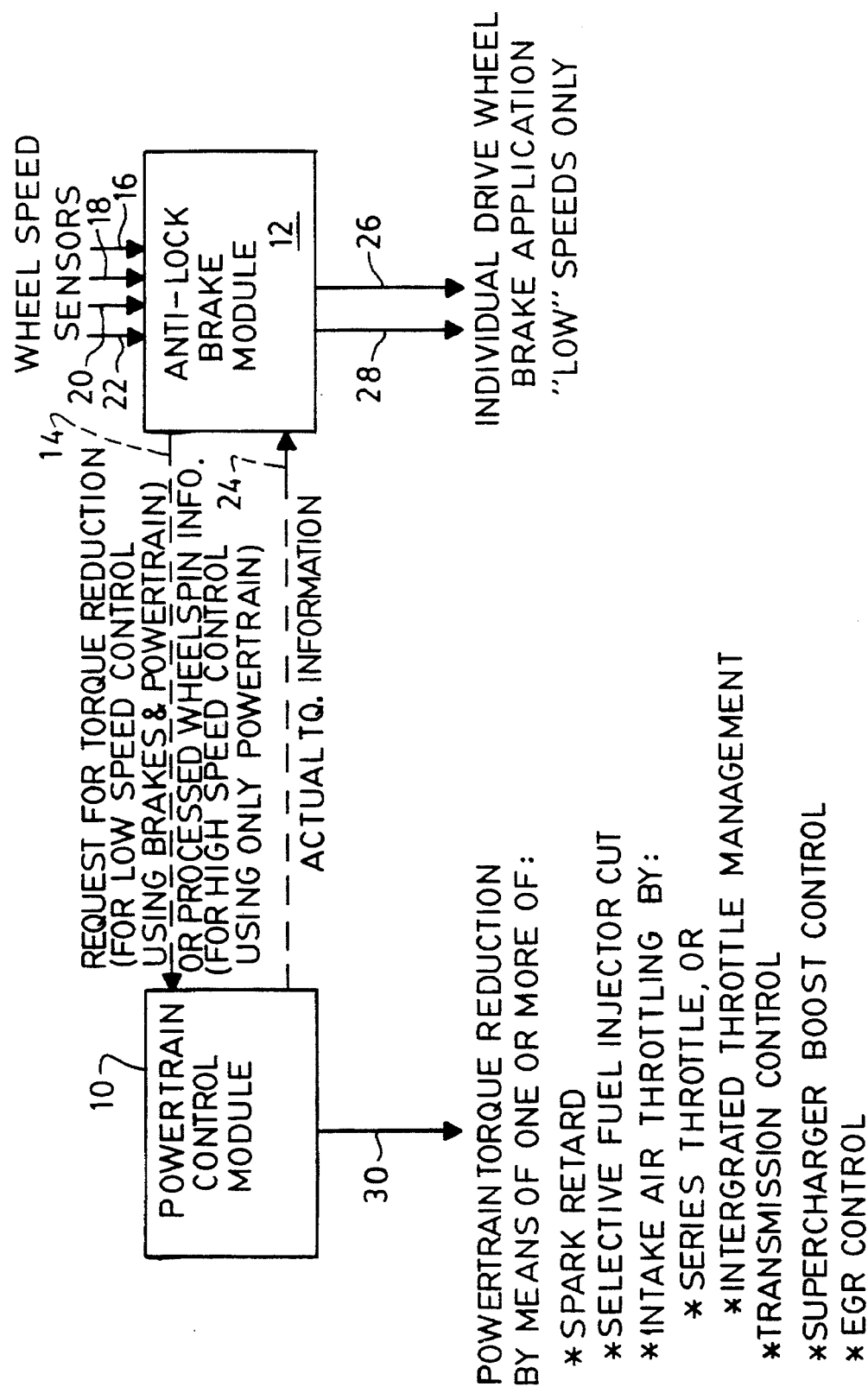
FIG. 2 is a schematic representation of a means for interfacing the engine control module with the vehicle traction wheel control module, the system illustrated in FIG. 2 being a subassembly of the overall system of FIG. 1.

In FIG. 2, the powertrain control module of the microprocessor for the vehicle powertrain is identified by reference numeral 10. It receives from an anti-lock brake module 12 a signal for a request for torque reduction. This signal is identified in FIG. 2 by the signal flow path 14. The request for a torque reduction occurs when the magnitude of the wheel speed received on signal paths 16 or 18 for the drive wheel exceeds the driven wheel speed signals delivered to the module 12 through signal flow paths 20 and 22.

The information received by the module 10 in the signal flow path 14 results in a response in the form of a predicted actual torque reduction signal delivered to the module 12 through signal flow path 24. As a result of that predicted actual torque reduction signal value, the module 12 develops a modified individual drive wheel brake application signal and delivers it to wheel brake actuators through signal lines 26 and 28.

The powertrain control module 10 achieves the powertrain torque reduction, as indicated by signal flow line 30, by initiating a spark timing reduction, or by a selective fuel injector cut-out, or by throttling the intake air by means of a series throttle or a secondary throttle as will be explained subsequently, or by controlling the transmission by forcing a transmission upshift, or by changing the supercharger boost control in the case of a supercharged internal combustion engine, or by changing the signal that is used to control the EGR exhaust gas recirculation valve.

Figure 5:
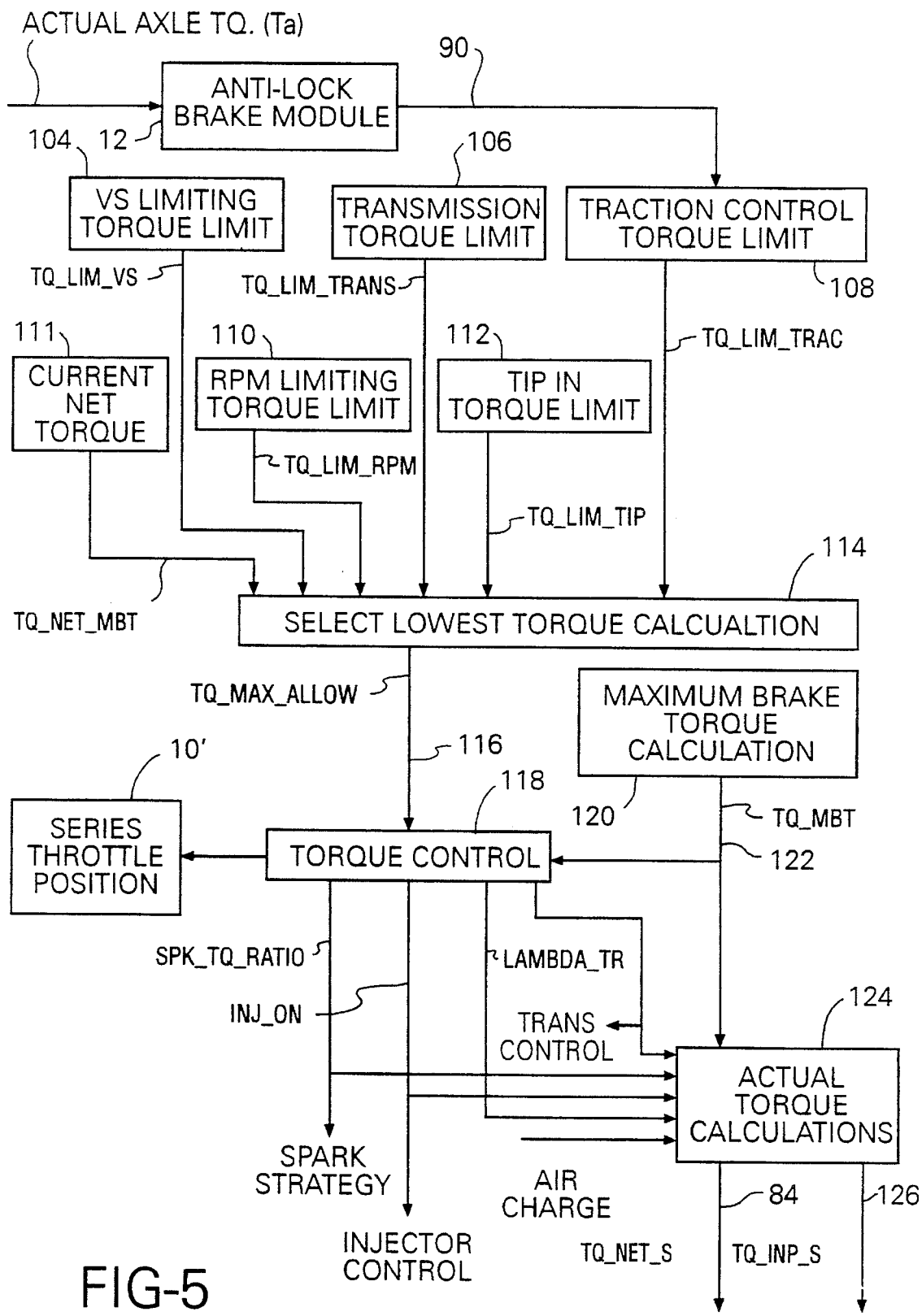
FIG. 5 is a software flow diagram illustrating the relationship of the various control modules and the torque control strategy of our improved traction wheel slip controller.
Figure 6:
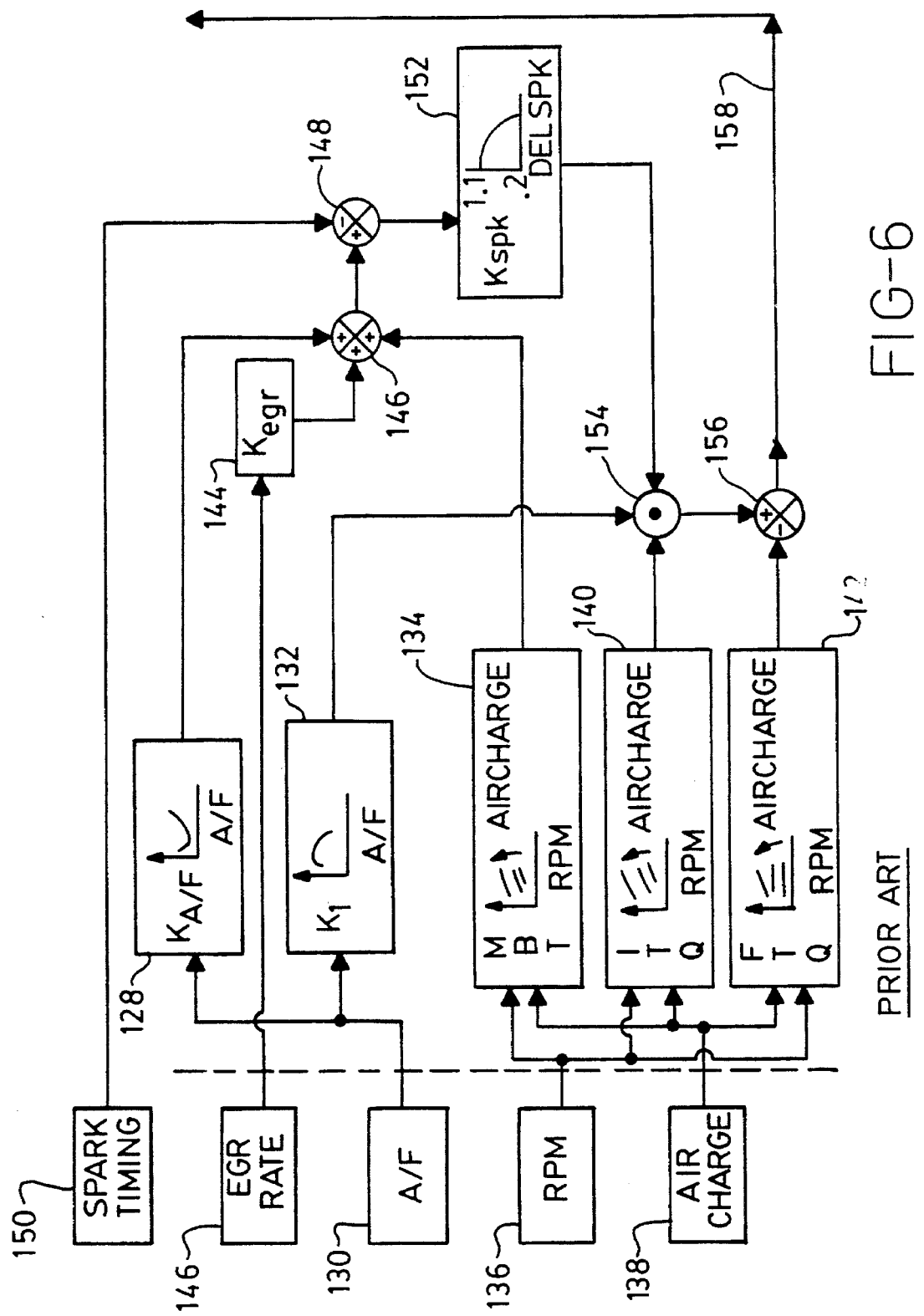
FIG. 6 is a schematic illustration in block diagram form of the software strategy for controlling engine torque when a demand for an engine torque modification is made by the traction wheel slip controller.

For purposes of describing one embodiment of the system, we will explain, with reference to FIGS. 5 and 6, a torque reduction achieved by controlling the spark retard.

Since the traction control unit can continuously measure the angular velocity of the drive wheels and compute the rate of change of angular velocity to obtain an acceleration signal, a knowledge of the physical contents $F_d$, $J_w$ and $r_d$ and a knowledge of the torque applied to the driving wheels allows a mathematical determination of the quantity $\mu$, which is a function of the road surface conditions. The road surface conditions can change continuously, and possibly abruptly, during a slip control operating mode. Since the quantity $\mu$ can be continuously calculated, it then becomes possible to compute, during each background loop of the controller, the ideal control torque needed to decelerate the drive wheel assembly at a given rate until the desired target wheel spin is achieved.

The torque acting to accelerate the drive wheel is a basic parameter of our improved system. It serves as a state variable for the entire control system.

In a typical automotive vehicle, there are two driving axle shafts or half shafts. In the case of a two-wheel drive vehicle, a geared differential acts to maintain equal torque on both of the two axle shafts or half shafts. Thus, either the torque on one shaft or the other, or the total torque of the two shafts, can be used for control purposes. The conversion of the torque signal representing torque on one shaft can easily be converted by simple algebra to a torque signal representing the torque on the other shaft. Furthermore, final drive gearing upstream of the differential gearing assembly, which consists usually of gears or chain sprockets, is usually a fixed ratio. Thus, it is possible easily to convert the torque acting to accelerate the wheels to transmission output shaft torque. Although total axle torque is used in our improved system as a control parameter for achieving engine torque management to control wheel spin, these other simple derivatives would be functionally equivalent.

Information is transmitted to module 12 from the powertrain controller 10, as indicated in FIG. 2. It is preferable to employ wheel brake application as a slip control parameter only during operation in low vehicle speeds. At higher vehicle speeds, the control management is achieved by powertrain output torque reduction only. For small amounts of torque reduction, powertrain output torque reduction is achieved by developing an appropriate spark retard signal to achieve the desired torque reduction. This spark retard signal, as indicated in FIG. 2, is an output signal of the powertrain control module 10.

Figure 1:
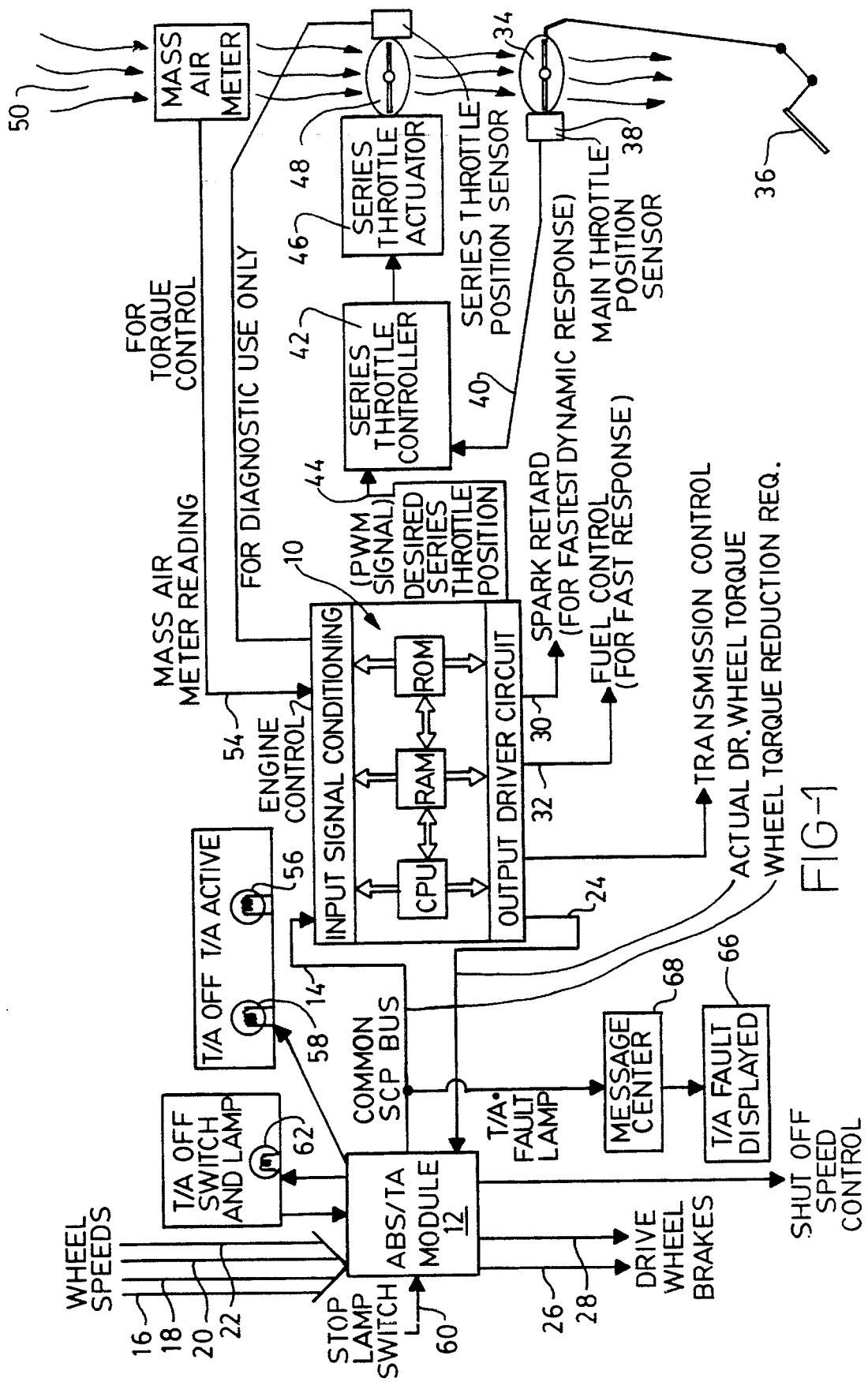
FIG. 1 is a schematic system diagram of a traction assist control system for an automotive vehicle having an electronic engine controller and a traction assist module for the vehicle traction wheels, the system being adapted to include the improvement of our invention.

The response of the control system to the brake application signal from the module 12 could be designed to be the fastest type of response. The next fastest response is the torque reduction that would be caused by a spark retard by the module 10. If the torque reduction is insufficient due to the spark retard, further torque reduction by module 10 in response to a request for torque reduction by the module 12, may be effected by a fuel injector cut-out on a selective basis. In FIG. 1, the output signal flow path for fuel control is shown at 32.

If the control system includes a series throttle, then the series throttle can be moved toward a closed position until injector cut-out no longer is required. The series throttle arrangement will be described with reference to FIGS. 1 and 3.

Shown also in FIG. 1 is a diagrammatic representation of a series throttle arrangement. This includes a main throttle illustrated generally by reference character 34. A throttle blade is connected mechanically to a vehicle accelerator pedal 36. The throttle position is sensed by a main throttle position sensor 38. The output of the signal sensor 38 is delivered through signal flow path 40 to the module 10.

An output signal from the powertrain controller 10 is delivered to a series throttle controller 42 through a signal flow path 44. The magnitude of the signal in flow path 44, which may be a pulse width modulated signal, is a measure of the desired series throttle position. Series throttle controller 42 drives a series throttle actuator 46, which in turn drives series throttle blade 48 located upstream from the main throttle 34. The air intake for the air/fuel system of the vehicle engine is schematically designated by reference numeral 50.

A mass air flow meter 52 measures the actual air flow in mass units per unit in time. The output of mass air flow meter 52 is delivered through signal flow path 54 to the input signal conditioning portion of the module 10.

When the module 12 is acting to limit wheel spin, an indicator lamp 56 is energized as indicated schematically in FIG. 1. If module 12 is disabled by the driver, indicator lights 58 and 62 are energized. If the stop lamp switch is energized as the vehicle operator applies the vehicle wheel brakes, a signal is delivered through signal path 60 to the module 12, thereby switching the primary mode of the operation of the module 12 from the traction control function to anti-lock braking.

If the traction assist has a disabling fault, an indicator lamp 66 is displayed as it is so instructed by message center 68.

Figure 3:
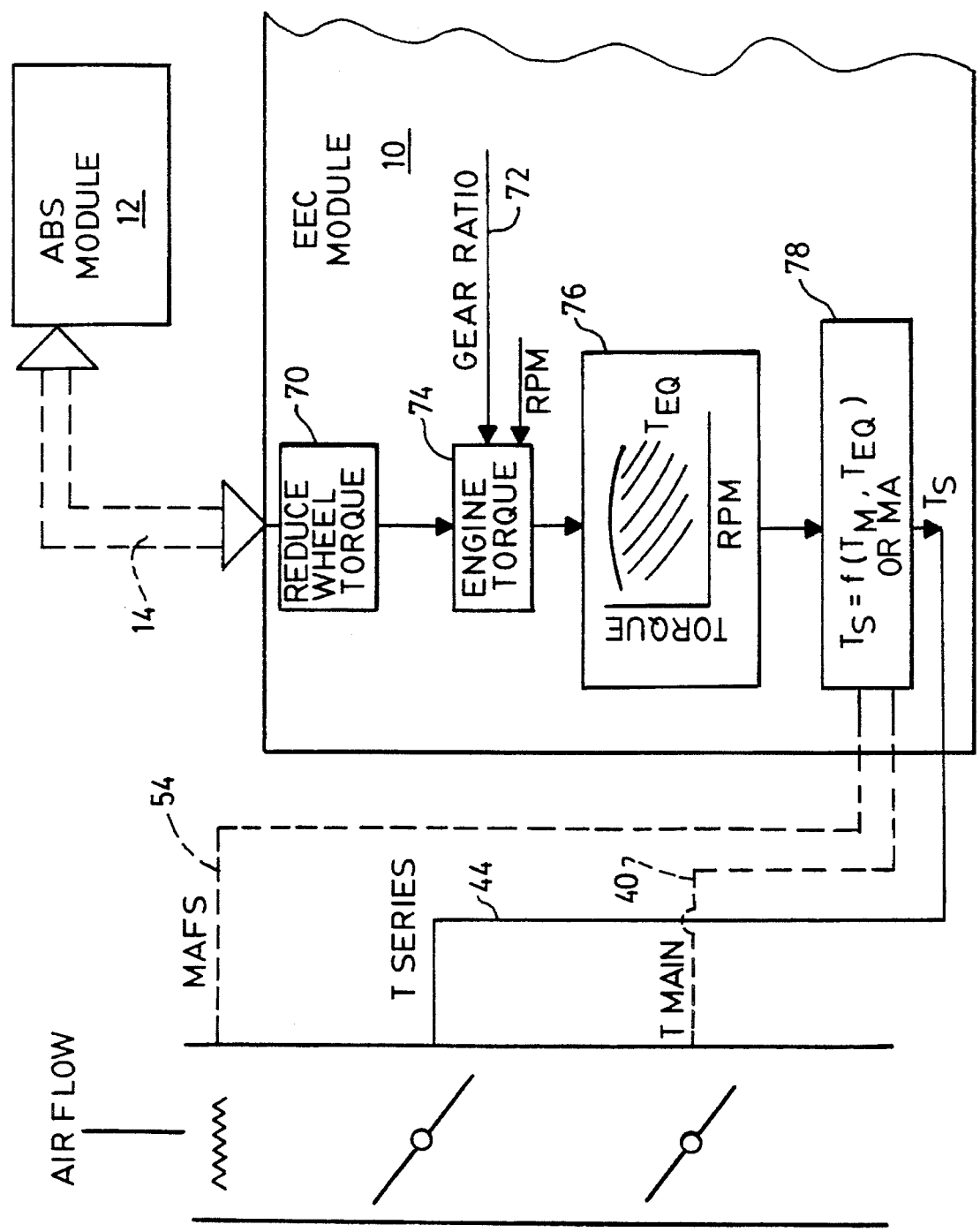
FIG. 3 is a schematic software block diagram of the portion of the controller that effects a change in a series throttle setting during wheel slip control operation of the controller of our invention, the series throttle being one of the elements for powertrain torque reduction control when the slip controller requires a change in axle torque.

FIG. 3 shows generally in block diagram form the functions of the module that are relied upon to achieve a correction in actual axle torque as a request for torque reduction is indicated by the module 12. The signals received from the module 12 through path 14, during the execution of repetitive control loops, are received by the input processing portion of the module. After being received and conditioned, the information is distributed to the RAM section of the computer memory in the form of reduced wheel torque request data, as indicated at 70. The CPU portion of the microprocessor 10 fetches information from the register containing the torque reduction request, as well as information from registers that contain the current gear ratio and other data, as shown at 74, and addresses registers in ROM where a table, including a function of engine speed and engine torque, is stored as indicated at 76. The CPU obtains from ROM, during each control loop, a functional relationship as indicated at 78. This will determine a series throttle setting, using as input data the main throttle setting supplied to the module through signal flow line 40 and the mass air flow signal delivered through signal line 54. This develops an output signal in the driver portion of the controller, which drives the series throttle ($T_S$).

All of the functions schematically illustrated in the diagram of FIG. 3 may not be required if the torque reduction can be achieved solely by the spark retard function.

Figure 4:
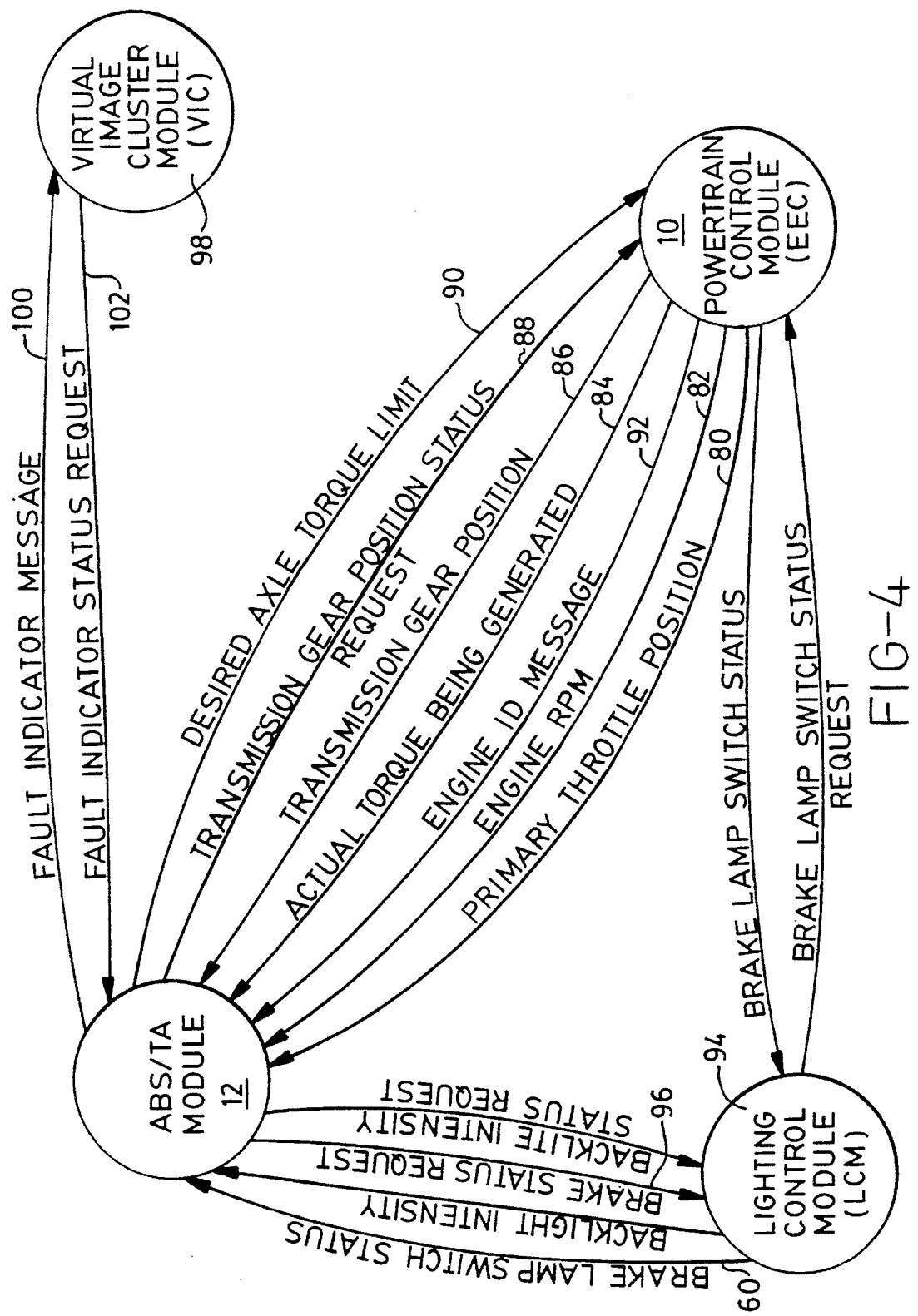
FIG. 4 is a generalized diagram of our improved traction assist mechanism illustrating the flow paths for the traction assist messages transferred between the electronic powertrain controller and the drive wheel slip controller.

Shown schematically in FIG. 4 is a diagram that shows the pattern of message transfers for the signals during the interfacing of controller 10 with respect to controller 12. The position of the primary throttle is transmitted from the controller 10 to the controller 12 through signal flow path 80. The engine speed information is transferred over message flow path 82 to the module 12. The actual axle torque being generated is computed by the controller 10 and transmitted through message flow path 84 to the controller 12. The transmission gear position is transmitted from controller 10 to controller 12 through message flow path 86 in response to a transmission gear position status request from the controller 12 to the controller 10 through message flow path 88 and whenever a gear change occurs.

The desired axle torque limit, which is the main message illustrated in FIG. 4, is transmitted to module 10 from the module 12 over a message flow path 90. The purpose of this message is to achieve a drive wheel torque reduction.

The actual torque being generated is made known by the module 10 to the module 12 through flow path 84 so that module 12 can set an optimum value for the torque limit when wheel spin occurs. This will be further explained subsequently.

An engine identification message is sent from module 10 to module 12 through message flow path 92 to assist in the calibration of module 12. Thus, the module 12 can be calibrated to suit the requirements of any particular engine during driveline calibration.

The message delivered to the module 12 dealing with the brake lamp switch status through message flow path 60 is in response to a status request delivered to the lighting control module 94, shown in FIG. 4, through the message flow path 96 and whenever a gear change occurs.

The message delivered through flow path 80 dealing with pedal position is useful during low pedal demand to achieve a different response for low pedal settings versus high pedal settings. It is useful also for hill climbing strategy. It may be used as well in a strategy for controlling torque restoring rate when the wheels suddenly stop spinning upon encountering dry pavement after leaving a low friction surface.

The virtual image cluster module 98 (VIC) provides a fault indicator message to the vehicle operator. A fault message is transferred to module 98 through message flow path 100 in response to a fault indicator status request to the module 12 through message flow path 102 and also whenever a fault occurs.

The relationship of the modules in the torque control strategy is schematically illustrated in the flow diagram of FIG. 5. The principal submodules included in the strategy of FIG. 5 are a vehicle speed-limiting torque limit submodule 104, a transmission torque limit submodule 106, a traction control torque limit submodule 108, a speed limiting torque limit submodule 110, and a tip-in torque limit submodule 112. The tip-in torque limit submodule 112 limits the increase in net torque during a throttle tip-in operation as the vehicle operator suddenly advances the accelerator pedal. This reduces powertrain wind-up and impact caused by driveline backlash. The rate of torque increase is controlled using spark only.

Vehicle speed limiting torque limit submodule 104 determines the maximum engine torque allowed by vehicle speed limiting ($T_Q\_LIM\_VS$). It will create a torque reduction if a predetermined vehicle speed is reached. The submodule 110 establishes a maximum engine torque as allowed by the engine speed limiting ($T_Q\_LIM\_RPM$). Submodule 106 determines the maximum net engine torque that is allowed by the transmission control strategy. This will create a limit on engine torque if the torque rating for the transmission is approached. The maximum torque requirement usually occurs when the low and reverse brake is actuated. Current net torque is determined by submodule 111. The torque at 111, represented by signal $T_Q\_Net\_MBT$ is the same as net engine torque ($T_{Q-Net}\_S$) if no torque reduction from any of the submodules is commanded, including a torque reduction command for slip control.

The information received from the submodules 104 through 112 is delivered to action block 114. The microprocessor, at action block 114, will compare the values received from submodules 104 through 112 and will compare the values that are fetched from temporary storage registers in RAM. The selection of the lowest net torque value at 114 is used for purposes of torque calculation. This is indicated in FIG. 5 to be the allowable torque ($T_Q\_MAX\_ALLOW$) that is transmitted through signal path 116 to torque control submodule 118.

The value of the signal $T_Q\_LIM\_TRAC$ in FIG. 5 is a maximum allowable torque as commanded by the module 12. The actual axle torque, seen as an input to module 12 at the top of FIG. 5, is derived from $T_Q\_NET\_S$ through knowledge of gear ratio in the transmission, axle ratio, etc. The signal $T_Q\_NET\_S$ is the equivalent of net engine torque. This is the same as desired axle torque signal at flow path 90 in FIG. 4 except for the effects of gear ratio, axle ratio, etc.

A maximum brake torque calculation occurs at action block 120. The value $T_Q\_MBT$ that is determined at action block 120 and delivered to the torque control 118 through signal flow path 122 depends upon the calibration of the engine using an engine mapping technique. The value delivered through signal flow path 122 is required in the actual torque calculation that occurs at action block 124, where the net engine torque is determined. This is the net actual torque produced by the engine, which used to determine the total axle torque signal $T_a$. The signal $T_a$ is transferred, as mentioned earlier, through signal flow passage 84 to the module 12.

The signal that is developed by the actual torque calculation at action block 124 is distributed to signal flow path 126. This is the actual net torque passed to the transmission. From this routine, the total axle torque $T_a$ thus can be computed and transferred, as mentioned, to module 12 through signal flow path 84, seen in FIG. 4. The action block 118 also computes an air/fuel ratio adjustment signal (LAMBDA_TR), as seen in FIG. 5, to compensate for the reduction in engine torque.

The total axle torque ($T_a$) is useful, as explained earlier, in the computation of the tractive force $F_t$. Thus, the ideal torque can be achieved for the purpose of decelerating the wheel and hub assembly at a given rate until a small, predetermined target wheel slip is obtained.

The magnitude of the torque delivered to the transmission, of course, can be easily converted from net engine torque using algebraic conversion terms into the actual torque required by the wheel and hub assembly since the transmission gearing ratio, the final drive ratio and the axle ratio are known quantities.

Shown in FIG. 6 is a schematic representation of one method for predicting torque in the torque control action block 118 and the actual torque calculation action block 124 of FIG. 5. The method illustrated in the software diagram of FIG. 6 is a method for controlling the spark timing to achieve the desired torque control. This can be used in conjunction with the previously described fuel control routine, although either can be used independently. They can also be used together as explained previously.

The control functions that are illustrated schematically in FIG. 2 are carried out in the electronic microprocessor shown at 10 in FIG. 1. That processor is an integrated central processor adapted to convert the input signals, such as EGR valve position, engine speed and air flow into electrical signals that control series throttle position, main throttle position, spark advance and fuel supply. The processor receives these input signals at the input signal conditioning portion of the processor 10. After initializing and after setting control flags, the signals are delivered to the CPU portion of the processor.

The information received by the input signal conditioning portion of the processor is operated on in the CPU in accordance with the program control strategy stored in memory (ROM). Appropriate gates and driver circuits for delivering the output that results from the operation of the strategy determines series throttle position, the spark timing, crankshaft torque and air/fuel ratio. Selected fuel injector cut-out, control of the supercharger boost or control of EGR also can be carried out with similar routines.

The program strategy is stored in the ROM portion of the processor and the read/write or RAM portion of the memory temporarily stores input data and intermediate results of calculations carried out by the CPU.

The processor executes programs obtained from ROM and provides an appropriate control signal that is delivered to the output driver circuits. The output data that results from the computations occurring in the CPU, or the arithmetic logic portion of the processor, is temporarily stored in RAM where it can be addressed, fetched, erased, rewritten or changed depending upon the operating conditions of the vehicle. The CPU portion of the processor that performs these computations may comprise an integrated circuit that is distinct from the microprocessor chip that comprises the memory portions. The CPU computation portion and the memory portions are connected by internal bus and interface circuitry, as schematically illustrated in FIG. 1.

Data may be read from a first memory location as the processor seeks an instruction from memory, and the fetched data then is fed to a data register or storage area and then to an instruction decoder.

In carrying out an instruction, the data that is fetched is transferred to an arithmetic logic unit; then sequentially, pursuant to instructions in the instruction decoder, other data may be fetched from memory and fed into the data registers. The data may be air charge information or air/fuel ratio information for example, and it may be stored in an accumulator until it is addressed during the sequencing of the processor. Repetitive calculations are done in each background loop or pass.

The data in the accumulator is sequentially transferred to data registers and then fed to the memory and stored in the next memory location within the RAM portion where it be addressed during the next background loop of the processor.

The stored information in ROM may be in the form of functions, or it may be in the form of information in a table containing three variables or data such as timer values or engine speed and two other pieces of data or variables such as air charge, engine crankshaft torque and friction torque.

In the software representation of FIG. 6, a memory register 128 stores a function for a maximum engine crankshaft torque spark adjustment with an input from a mass air flow sensor indicated schematically at 130. Register 132 in memory stores an indicated torque adjustment for air/fuel ratio in the form of a control function. It also has an input from the sensor 130.

Register 134 has a stored table for an unadjusted maximum engine crankshaft torque. It has inputs from engine speed sensor 136 and an air charge sensor 138. Register 140 has a table for unadjusted indicated torque and has inputs from sensors 136 and 138. Register 142 contains a stored table indicating friction torque for various engine speeds. It has inputs from the speed sensor 136 and the air charge sensor 138.

Register 144 contains a maximum engine crankshaft torque spark adjustment that depends upon an exhaust gas recirculation valve signal from sensor 146.

The signals that are obtained from registers 128, 144 and 134 are transferred to a summing point 146 and are compared algebraically. The algebraic sum then is distributed to summing point 148. The maximum engine crankshaft torque spark adjustment determined at the summing point 146 is the sum of the outputs of the three registers 128, 134 and 144.

A negative input from spark timing sensor 150 is distributed to the summing point 148 and is combined with the positive output of the summing point 146. To determine the difference between the maximum engine crankshaft torque and the actual spark advance values, the output of the summing point 148 is transferred by the processor to register 152 which contains a function that provides an indication of the torque adjustment for spark retard. The spark retard output signal is applied to a multiplier 154, which also has inputs from registers 132 and 140. The information in register 154 is transferred to summing point 156. The information transferred to summing point 156, in effect, is the product of the information fetched from registers 140, 132 and 152.

The output of the multiplier 154 is applied to the summing point 156 to develop, after accounting for friction torque determined at 142, an inferred or predicted engine crankshaft torque signal delivered through signal flow path 158.

The functions illustrated in FIG. 6 are supplemented with functions and data transferred between modules 10 and 12, as indicated by the message transfer diagram of FIG. 4. When a desired axle torque limit is transferred to the powertrain controller 10 through message delivery path 90 of FIG. 4, the controller will respond as indicated generally with reference to the description of FIG. 6, to produce the desired delta spark or change in spark that would result in the necessary spark timing to achieve a torque reduction demanded by the module 10, or for achieving the necessary fuel control adjustment, if appropriate, to achieve that torque reduction. As indicated earlier, the fastest response is obtained by adjusting spark. The next fastest response for achieving the desired torque reduction is an adjustment in fuel control. The series throttle response is slower still.

As indicated in FIG. 5, the actual axle torque derived from signal TR__INP__S at signal flow path 126 is transmitted to the module 12. If the excess driving wheel speed is such that a reduction of engine torque is indicated, the command for reduced engine torque will be distributed to the controller 10 through signal flow path 90. It is received by the traction control torque limit submodule 108, which issues a new output signal $T_Q$__LIM__TRAC. This signal is passed to the Select Lowest Torque Calculation submodule 114.

Under normal traction control circumstances, the signal generated by the submodule 108 is lower than the signals generated by submodules 106 or 104.

The current net torque is monitored by the submodule 111, shown in FIG. 5. The output signal $T_Q$__Net__MBT generated by the submodule 111 is delivered to the Select Lowest Torque Calculation submodule 114. The signal $T_Q$__LIM__TRAC, under normal traction control circumstances, also is lower than the signal $T_Q$__Net__MBT. Thus, the reduction in torque message transferred to submodule 108 through signal flow path 90, under normal traction control circumstances, is transferred directly through the controller to the torque control submodule 118. Thus, the reduced engine torque usually is the same as the value $T_Q$__MAX__ALLOW passed from the submodule 114 through the signal flow path 116.

The torque control submodule 118 establishes a torque ratio which is equal to ($T_Q$__MAX__ALLOW plus miscellaneous torque losses) divided by (T__MBT); i.e., $$\frac{T_Q\_MAX\_ALLOW + Losses}{T_Q\_MBT}.$$

The quantity $T_Q$__MBT, as explained previously, is the maximum brake torque calculation carried out at submodule 120. This is the maximum torque that can be developed by the engine for any given throttle setting. The value that appears in submodule 120 is recorded in RAM and fetched each background loop.

Thus, the command for torque reduction that passes through signal flow path 90 results in a change in the torque ratio developed by the torque control submodule 118.

The control strategy that determines the magnitude of the command for torque reduction, as explained previously, may be determined approximately by the functional relationship:

$$F_t \approx F_m \approx \mu \times F_d \approx \frac{T_a - J_w \frac{\delta \omega^2}{\delta t^2}}{r_d}$$

That functional relationship is stored in ROM. Thus, the appropriate value for $F_t$ can be determined since the total axle torque $T_a$ is known. The reduction needed to establish a correct $F_t$ value then can be determined. FIG. 5 shows at 10' only the portion of the processor that controls the series throttle, which was described previously with reference to FIGS. 1 and 3. The portions of the processor that control spark and fuel injection constants are not illustrated in FIG. 5. Neither is the wheel brake controller illustrated in FIG. 5.

FIG. 7 is a supplementary system diagram that includes the portion of the controller devoted to electronic series throttle control, as shown at 10' in FIG. 5. The series throttle, the main throttle injector control and spark timing, shown in FIG. 7, correspond to the schematic representations of those elements in FIG. 5.

FIG. 7 also shows in further detail the signal flow path developed by the module 12 for wheel brake control at low vehicle speeds. The signals for wheel brake control are transferred through signal flow paths 26 and 28 for the drive wheels 160 and 162.

As in the case of the spark timing control described with reference to FIG. 5 and the series throttle control of FIGS. 1, 3 and 7, the torque control at 118 is not used to control traction if $T_Q$__Net__S is the same as $T_Q$__Net__MBT. In that case, the torque ratio described previously is one. If, however, traction control is called for, the ratio $$\frac{T_Q\_MAX\_ALLOW + Losses}{T_Q\_MBT}$$

is less than 1 (e.g. 0.50), and traction control will be initiated by adjustment of spark timing using the spark control routine described with reference to FIG. 5, or with the series throttle arrangement described with reference to FIGS. 1, 3 and 7.

Having described a preferred embodiment of our invention, what we claim and desire to secure by U.S. Letters Patent is:

1. A traction control mechanism for a wheeled vehicle having driving and non-driving wheels and a powertrain with a spark-controlled internal combustion engine;

said engine including an engine torque control means for controlling mass air and fuel mixture flow, fuel flow and spark timing, said driving wheels having an effective driving wheel drive radius;

said vehicle having a driving axle for each of said driving wheels;

torque of said engine being a characteristic operating function of engine operating variables including mass air and fuel mixture flow, engine spark timing and fuel flow;

means for determining actual net driving wheel torque at said driving wheels comprising an electronic wheel speed controller, wheel speed sensor means for developing wheel speed signals that are variables indicative of the speeds of said wheels, said driving and non-driving wheels, said wheel speed controller including means for comparing said wheel speed signals and for developing an engine torque reduction command signal in response to detection of a predetermined difference in the speeds of said driving wheels and said non-driving wheels;

electronic powertrain control means including input signal portions communicating with said wheel speed sensor means for developing output signals for actuating said engine torque control means to achieve engine torque reduction in response to said engine torque reduction command signals, a change in each of said engine operating variables affecting engine torque in accordance with said characteristic operating function;

said engine torque reduction command signals from said wheel speed controller being indicative of total desired engine torque;

said electronic powertrain control means having a memory portion containing an actual net driving wheel torque and traction force function and a processor portion, said processor portion communicating with said memory portion and executing said function using said wheel speed variables, said function being expressed as:

$$F_t \approx \frac{T_a - J_w \frac{\delta \omega^2}{\delta t^2}}{r_d}$$

where $T_a$ is the actual torque on said axle for each of said driving wheels, $J_w$ is inertia torque and $r_d$ is said effective driving wheel drive radius, whereby said difference between driving wheel speed and non-driving wheel speed is contained within a predetermined range of values;

means for delivering from said electronic powertrain control means to said wheel speed controller a feedback signal indicative of calculated actual net driving wheel torque in response to said engine torque reduction command signal whereby said difference in driving wheel speed and non-driving wheel speed is maintained at a value less than a predetermined value; and means for implementing engine torque reduction commanded by said engine torque reduction command signal so as to reduce engine torque to said total desired engine torque including means for selectively activating said engine torque control means for controlling said mass air and fuel mixture flow, said fuel flow and said spark timing.

2. The traction control mechanism as set forth in claim 1 wherein said driving wheels include wheel brakes and wherein said wheel speed controller includes means for establishing a driving wheel braking signal in response to changes in said driving wheel speed relative to non-driving wheel speed whereby a reduction in excess driving wheel slip occurs to achieve traction control.

3. The traction control mechanism as set forth in claim 1 wherein said engine has an air/fuel manifold with a main throttle and a series throttle;

said electronic powertrain control means including means for adjusting said series throttle whereby a change in engine output torque is achieved;

said feedback torque signal delivered to said wheel speed controller being affected by an adjustment in said series throttle in response to said torque reduction command signal.

4. The traction control mechanism as set forth in claim 1 wherein said electronic powertrain control means includes means for adjusting said spark timing in response to said engine torque reduction command signal.

5. The traction control mechanism as set forth in claim 1 wherein said electronic powertrain control means includes means for adjusting fuel flow in response to said engine torque reduction command signal.

\* \* \* \* \*